Sept. 29, 1925.  1,555,504
J. C. V. KRAYENBÜHL
ASEPTICAL VACUUM REDUCTION VALVE FOR SUCKING MILKING MACHINES
Filed Feb. 26, 1923
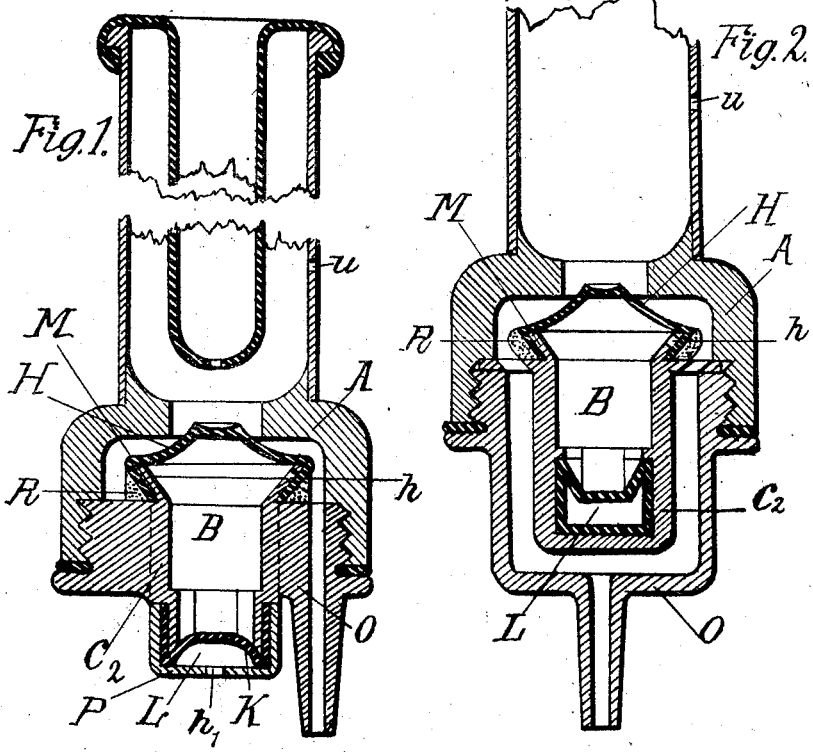
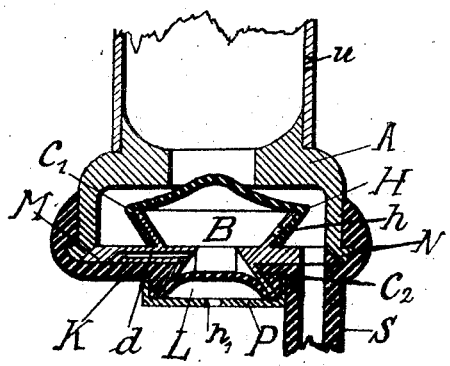

Patented Sept. 29, 1925.

1,555,504

UNITED STATES PATENT OFFICE.

JEAN CHARLES VALDEMAR KRAYENBÜHL, OF FREDERIKSBERG, NEAR COPENHAGEN, DENMARK.

ASEPTICAL VACUUM REDUCTION VALVE FOR SUCKING MILKING MACHINES.

Application filed February 26, 1923. Serial No. 621,424.

*To all whom it may concern:*

Be it known that I, JEAN CHARLES VALDEMAR KRAYENBÜHL, a citizen of Denmark, and resident of Frederiksberg, near Copenhagen, Denmark, have invented certain new and useful Improvements in Aseptical Vacuum Reduction Valves for Sucking Milking Machines, of which the following is a specification.

This invention relates to a pulsator valve located in the teat cup which opens the communication between the suction conduit and the teat cup on milking machines; therefore, there is a certain difference between the vacuum prevailing in the suction conduit and the vacuum prevailing in the teat cup. The invention has the object of meeting the bacteriological requirement that the valve surfaces which come into contact with the milk should be as smooth as possible and also as small as possible in order to prevent the deposition or settling of drops of milk. The valve is constructed in such manner that it can readily be sterilized or exchanged as a self-contained structure and milk cannot enter into the interior of the valve.

The invention consists in this that a diaphragm controlling the outlet of the teat cup is associated with the casing of a body which weighs down the diaphragm and which is slidable. The entire structure forming a self-contained closed insertion contains in its lower part an air cushion which supports said body having in its upper part openings which are covered by the diaphragm, the air being readily withdrawn by suction through these openings from the casing but neither air nor milk being adapted to return through the openings into the casing.

The drawing shows several embodiments of the invention.

Figure 1 is a vertical section through one embodiment;

Figure 2 is a vertical section through another one, and

Figure 3 is a similar view of another embodiment.

According to Figures 1 and 2, the pulsator valve is constructed as an insertion O which is adapted to be screwed into the teat cup A. The valve comprises a hollow conical casing part M and a contiguous weaker hollow cylindrical casing part $C_2$. These two parts together form a chamber partly of conical and partly of cylindrical shape in which a weighted body B is slidably disposed, the upper and lower ends of said body being closed by the diaphragms H and K respectively. The body B supports the diaphragm H and rests on the diaphragm K and fills the chamber of the valve almost completely. A hole $h$ is arranged in the wall of the conical part at the upper portion of the chamber, said upper portion being indicated at M, and air may be withdrawn by suction through said hole $h$ from the chamber.

In the embodiment illustrated in Fig. 3 the valve comprises a cylindrical casing part $C_1$ and a weaker cylindrical casing part $C_2$. These two casing parts together form a chamber which has different parts and a weighted body forming a stepped piston slidably disposed in this chamber, the larger end of the piston supporting the diaphragm H. In the wall of the chamber openings $h$ and $h_1$ are disposed through which air may be withdrawn from the chamber. The opening $h$ is closed by the diaphragm H which diaphragm is rendered air-tight by means of a ring R made of rubber and placed around the same. The opening $h_1$ is closed by a band of rubber and by a ring R also made of rubber and placed around the same. These conclusions have the effect that air may be withdrawn by suction from the chamber but neither air nor milk can return through these openings into the chamber. In its lower part the chamber is closed by the valve cam K and on the lower surface of this diaphragm the air pressure produced by an air cushion L becomes effective, which air cushion is provided in the lower part of the casing.

The air space of the air cushion L communicates in the embodiment shown in Figure 1 through an air passage $h'$ with the atmosphere. Through this passage the air entering into or blowing from the air cushion is throttled. In the embodiments shown in Figure 2 the air space of the air cushion is closed absolutely.

The operation is as follows:

When suction has been set up and the teat cup is attached to the teat, the air is withdrawn by suction from the teat cup and from the chamber. The milk now flows from the teat and the air in the air space L expands, whereby the diaphragm K shifts the weighted body B, said body pressing thereby the diaphragm against the outlet opening of the teat cup to close the latter. On the other hand, this operation leads to an opening of the same outlet by means of the diaphragm H as soon as a certain difference between the vacuum in the teat cup and the vacuum in the suction conduit is established.

When the milking operation is finished the communication to the air pump is interrupted and air may then enter through the openings $u$ into the teat cup. This permits the removal of the teat cups from the teats. The chamber of the valve, however, remains absolutely evacuated or at least approximately so, so that the pulsator device becomes effective immediately as soon as the milking operation again sets in.

Having thus described my invention what I claim as new is:—

1. An aseptical vacuum reduction valve for sucking milking machines comprising a teat cup having an opening, a closed hollow body, a valve casing, a vacuum-operated cushion in the lower end of the valve, a weighted body bearing on and actuated by said cushion and provided with openings, a hood membrane closing the upper end of the weighted body and covering the said opening and thereby permitting the air to be sucked out of the valve casing and preventing the air from reentering, said membrane being arranged between the teat cup and sucking connection to break the connection therebetween when a certain vacuum degree has been reached in the teat cup and to reestablish the connection when a certain difference is obtained between the vacuum in the teat cup and the sucking connection.

2. A valve as set forth in claim 1, characterized in this that the air cushion comprises a yielding part and a solid part forming a closing cap for the lower opening of the chamber casing and provided with a vent for the air cushion.

3. A valve as set forth in claim 1, characterized in this that the weighted body is constructed as a stepped piston slidably disposed in a correspondingly shaped stepped chamber, the narrower portion of which is provided with an air outlet opening covered by a band of rubber so that air can be withdrawn from the chamber by suction but cannot flow back into the chamber.

4. A valve as set forth in claim 1, characterized in this that the casing of the chamber comprises two conical parts which are united by a flange, said casing containing a chamber which is restricted on the plane of the flange but which is enlarged upward and downward, the upper opening being closed by the diaphragm and the lower opening being closed by the diaphragm engaging about the edge of the teat cup, while the central part of this diaphragm may form with a cap an air cushion, said air cushion being vented by a port of the cap.

In witness whereof I affix my signature.

JEAN CHARLES VALDEMAR KRAYENBÜHL.